(12) United States Patent
Waschbusch et al.

(10) Patent No.: US 10,013,810 B2
(45) Date of Patent: Jul. 3, 2018

(54) CONTOURING TOOL HAVING AUTOMATIC INTERPOLATION AND EXTRAPOLATION

(71) Applicant: Varian Medical Systems, Inc., Palo Alto, CA (US)

(72) Inventors: Michael Waschbusch, Rheinfelden (CH); Benjamin Haas, Wabern (CH); Armel Rosselet, Baden (CH)

(73) Assignee: Varian Medical Systems International AG., Zug (CH)

( * ) Notice: Subject to any disclaimer, the term of this patent is extended or adjusted under 35 U.S.C. 154(b) by 96 days.

(21) Appl. No.: 14/498,928

(22) Filed: Sep. 26, 2014

(65) Prior Publication Data
US 2016/0093110 A1    Mar. 31, 2016

(51) Int. Cl.
| | |
|---|---|
| *G06T 19/20* | (2011.01) |
| *G06T 7/174* | (2017.01) |
| *G06T 19/00* | (2011.01) |
| *G06T 7/12* | (2017.01) |

(52) U.S. Cl.
CPC ......... *G06T 19/20* (2013.01); *G06T 7/12* (2017.01); *G06T 7/174* (2017.01); *G06T 19/00* (2013.01); *G06T 2207/10072* (2013.01); *G06T 2207/20104* (2013.01); *G06T 2210/41* (2013.01); *G06T 2219/2008* (2013.01)

(58) Field of Classification Search
CPC ......... G06T 7/12; G06T 7/174; G06T 19/00; G06T 19/20; G06T 2207/10072; G06T 2207/20104; G06T 2210/41; G06T 2219/2008
See application file for complete search history.

(56) References Cited

U.S. PATENT DOCUMENTS

| | | | | |
|---|---|---|---|---|
| 2008/0260222 | A1* | 10/2008 | Kumar | A61B 6/032 382/128 |
| 2008/0317315 | A1* | 12/2008 | Stemmer | G01R 33/56509 382/131 |
| 2013/0033419 | A1* | 2/2013 | Dror | G06T 7/0083 345/156 |
| 2014/0044336 | A1* | 2/2014 | Heinlein | G06T 7/0012 382/132 |

OTHER PUBLICATIONS

Schenk et al., "Efficient Semiautomatic Segmentation of 3D Objects in Medical Images", MICCAI 2000: Medical Image Computing and Computer-Assisted Intervention, 186-195.*

(Continued)

*Primary Examiner* — Katrina Fujita

(57) ABSTRACT

An apparatus and method for generating a contour automatically based on one or more user-generated contours for a three dimensional (3D) structure. In one aspect, a method of integrating image contour generation and editing with contour interpolation and contour extrapolation is provided. Manual contour drawing and editing may be performed by a user while interpolation and/or extrapolation of contours is automatically calculated in the background. Results of the interpolation and/or extrapolation may be displayed immediately, allowing the user to easily make refinements to any contours, as needed. In one aspect, interpolated and extrapolated contours may be automatically adapted (e.g., recalculated) according to user-modifications of contours.

19 Claims, 7 Drawing Sheets

(56) References Cited

OTHER PUBLICATIONS

Dong et al. "Three-dimensional reconstruction of irregular shapes based on a fitted mesh of contours." Image and Vision computing 19.3 (2001): 165-176.*
Kels et al. "Reconstruction of 3D objects from 2D cross-sections with the 4-point subdivision scheme adapted to sets." Computers & Graphics 35.3 (2011): 741-746.*
Traina et al. "3D reconstruction of magnetic resonance imaging using largely spaced slices." Computer-Based Medical Systems., 1997. Proceedings., Tenth IEEE Symposium on. IEEE, 1997.*

* cited by examiner

CONTOURING TOOL HAVING AUTOMATIC INTERPOLATION AND EXTRAPOLATION

TECHNICAL FIELD

The present disclosure pertains generally to the field of processing images and, in particular, generating contours for defining structures in medical imagery.

BACKGROUND

The usage of medical imaging devices to diagnose and plan treatment for various internal ailments is well known. Often, an imaging device such as an X-ray device, Computer Tomography (CT), or Magnetic Resonance Imaging (MRI) device is used to generate one or more initial scans or images of the area of interest. Typically, once an image has been acquired, critical structures (e.g., regions or organs) disposed in the target area are specifically identified and marked so that treatment may be optimally directed. This process may be referred to as "segmentation." Segmentation of 3D medical images is a very common task in radiotherapy treatment planning, and is used for defining important structures in the image such as organs or tumor volumes. Structures may be readily apparent in the image (e.g., a bladder in a pelvic image), or they may not—for example, a therapy planning structure within certain regions of the image not having any corresponding anatomy. Although there are algorithms for automatic detection of some structures, much of the segmentation work still has to be done manually, because not all structures can be found automatically and most automatically detected structures require manual correction.

Usually, the 3D volumetric image is loaded into a software environment and visualized as a stack of parallel 2D images—so-called "image slices" or, more simply, "slices"—wherein a user employs a contouring tool and draws closed 2D contours in order to define a portion of the structure for segmentation. Structures may be delineated via, for example, a boundary (e.g., a contour) or an area. The drawing tool may be like a pencil, wherein the boundary of an area is drawn in, or alternatively, the drawing tool may be more like a brush, where an area is "painted" by the tool. Those 2D contours are finally combined to a 3D surface segment that describes the boundary of the region of interest.

By contouring in a slice-by-slice approach, a user of a contouring tool is able to define a 3D image structure incrementally. However, users typically do not draw a contour on each image slice when defining a 3D structure—rather, they draw a contour every few slices, leaving a gap in between. Then, an interpolation tool is used to interpolate one or more contours within the gaps. Interpolation reduces the number of slices with which a practitioner needs to interact, potentially improving the efficiency of using the contouring tool. After drawing one or more contours on, for example, every fourth slice of an image, the user can run an interpolation algorithm to fill the gaps (e.g., generate contours on the intervening planes) and review the result. In addition to interpolation, some contouring tools provide the functionality of contour extrapolation. Extrapolation can generate approximate contours on neighboring slices outside of the range of image slices containing user-generated contours, e.g., after drawing on one slice the user can run an algorithm that extrapolates the contours to one or multiple empty neighboring slices.

However, in conventional image contouring environments, both interpolation and extrapolation functions are implemented as separate tools from the contouring tool. Therefore, a user of a conventional contouring tool is forced to repeatedly switch between contour drawing and interpolation or extrapolation modes, in order to generate and refine a 3D structure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In one aspect, embodiments according to the present disclosure provide an apparatus and method for generating a contour automatically based on one or more user-generated contours, for a three dimensional (3D) structure. In one aspect, a method of integrating image contour generation and editing with contour interpolation and contour extrapolation is provided. Manual contour drawing and editing may be performed by a user while interpolation and/or extrapolation of contours is automatically calculated in the background. Results of the interpolation and/or extrapolation may be displayed immediately, allowing the user to easily make refinements to any contours, as needed. In one aspect, interpolated and extrapolated contours may be automatically adapted (e.g., recalculated) according to user-modifications of contours.

According to embodiments of the present invention, in one aspect a method is provided of automatically generating a contour based on user-generated contours in an image, where the image includes a number of image planes. The method includes receiving a user input that corresponds to at least two user-generated contours. The user-generated contours each have a respective image plane, and are nonadjacent to each other. A computer processor determines a set of image planes that are located between the image planes having the user-generated contours. The computer processor automatically generates interpolated contours on planes with the determined set of image planes, where the interpolated contours are based on the user-generated contours.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

Figure 1:
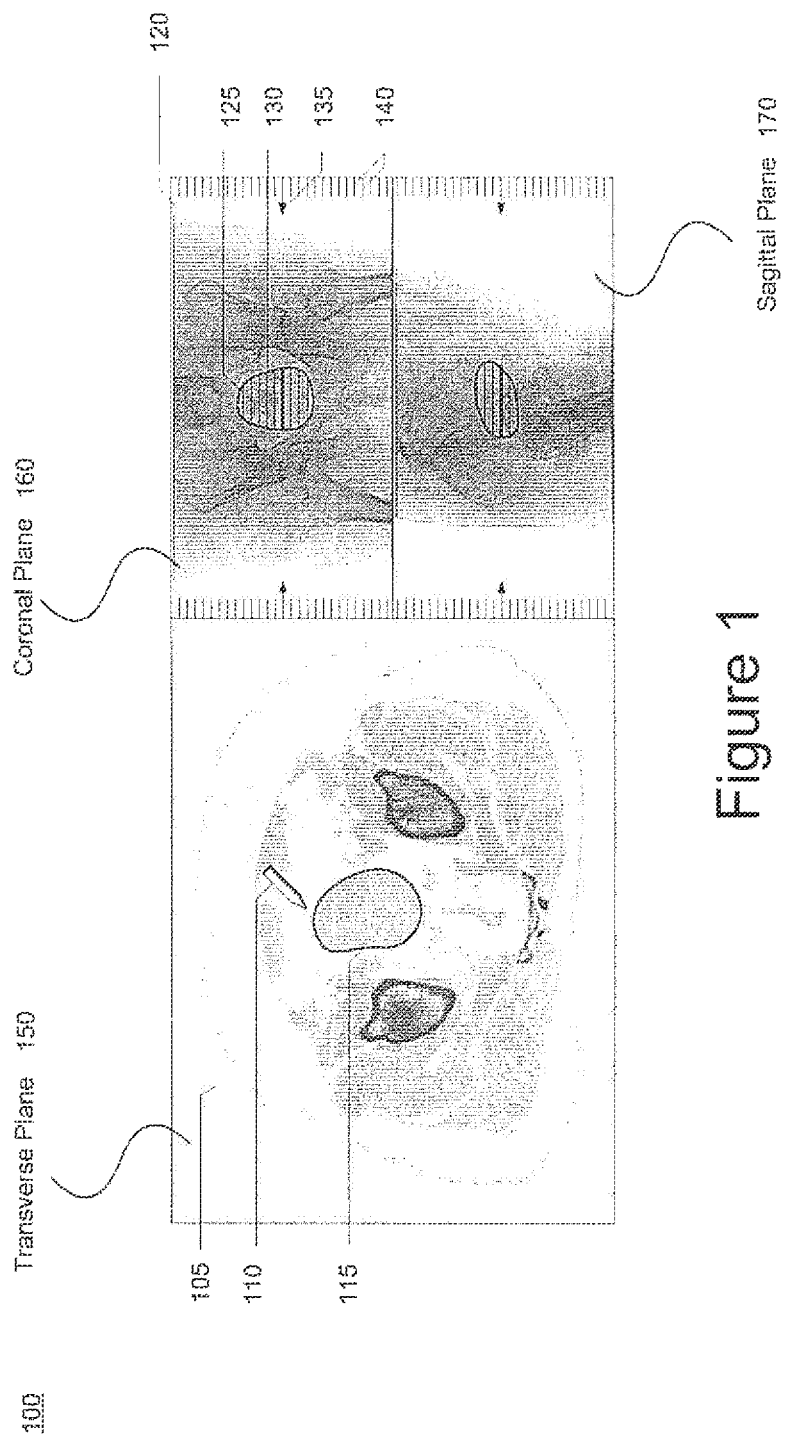
FIG. 1 depicts an exemplary graphical user interface (GUI) for a contouring program, displaying orthogonal planar views of image data, in accordance with embodiments of the present disclosure.

In contrast to conventional approaches, where a user must switch between separate drawing and interpolation/extrapolation tools in order to make iterative changes when contouring to generate a 3D structure, embodiments of the present disclosure including automatic interpolation and/or extrapolation integrated with a contour-drawing tool enable a reduction in trial-and-error contouring procedures.

According to an aspect of the present disclosure image slices may have planes arranged in parallel, but arbitrary, orientation in the image volume. For example, the image data need not be oriented in the canonical transverse, coronal, and/or sagittal planes (although these orientations are consistent with embodiments of the present disclosure). Parallel orientation of image planes enables contour-editing operations at any point in time. Interpolation and extrapolation algorithms known to one skilled in the art, such as geometric (e.g., linear, cubic, quadratic, spline-based) and pixel-based (e.g., intensity-based, level-set methods) algorithms, are consistent with embodiments of the present disclosure. The systems and processes disclosed herein emphasize the interaction between a user and the automatic algorithms (e.g., interpolation and/or extrapolation) without requiring a specific algorithm implementation. Furthermore, embodiments of the present disclosure naturally extend the well-known 2D "slice-by-slice" contouring approach to segmentation, and thus may be well-suited to less experienced segmentation users.

In some embodiments, the term "image" or "medical image" may be used interchangeably and refers to an image created by an imaging system, which includes but is not limited to x-ray radiography, X-ray computed tomography (CT) imaging, magnetic resonance imaging (MRI), positron emission tomography (PET) imaging, single photon emission computed tomography (SPECT) imaging, and ultrasound (US) imaging. A medical image can be either a 2D image or a 3D image. However, the system and methods herein are not limited to medical imaging, but may be applied in any drawing environment where 3D shapes are constructed by 2D drawing, such as 3D model construction, computer aided design, and relief generation in geographic systems.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Embodiments described herein may be discussed in the general context of computer-executable instructions residing on some form of computer-usable medium, such as program modules, executed by one or more computers or other computing devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Exemplary Contouring Graphical User Interface

With reference now to FIG. 1, an illustration of an exemplary contouring graphical user interface (GUI) drawing workspace 100 is depicted, in accordance with an embodiment of the present disclosure. Drawing workspace 100 provides a software environment in which a user can view and manipulate images having a plurality of 2D planes (e.g., image slices) that together form a 3D volume, e.g., medical images. Using well-known techniques, users can navigate from slice-to-slice and viewing plane-to-viewing plane within drawing workspace 100 for a given image. Drawing workspace 100 comprises a main display 105, the main display 105 showing an image slice with which a user is able to interact. Also shown is an exemplary drawing tool 110 with which the user may enter contours on the displayed image slice. An exemplary contour 115 is shown, drawn on the image slice by the user. For example, the user is able to enter a contour using drawing tool 110. While drawing tool 110 is shown as a pencil, the drawing tool 110 may change appearance and functionality according to user selection, and is able to generate and edit contours through 2D contour generation means known to one skilled in the art, including a drawing pencil, a paintbrush, polygon or curve tools, and others. The user may be able to edit a contour via, for example, grabbing part of the contour 115 line and pulling with the drawing tool 110. Alternatively, the drawing tool 110 may serve to trim the contour 115. Further embodiments provide the capability of drawing additional lines and/or contours and merging with an existing contour.

Although not shown, drawing workspace 100 may include toolbars having options for displaying and controlling various aspects of the drawing workspace 100. These may include control of a mode of the drawing tool 110, a mode of contouring tool operation (e.g., interpolation, extrapolation, a combination of interpolation and extrapolation), navigation within an image volume, image selection, etc. The drawing workspace 100 may include additional views, as shown in FIG. 1. For example, the drawing workspace 100 may display a view corresponding to the transverse viewing plane 150, a view corresponding to the coronal viewing plane 160, and a view corresponding to the sagittal viewing plane 170. However, views of drawing workspace 100 are not limited to transverse, coronal, and sagittal viewing planes.

These additional views may be, for example, useful for displaying an overview of the image data and the defined contouring for the loaded image. Additional views may display, for example, a set of slices of the image volume, projections such as digitally reconstructed radiographs corresponding to various viewing angles, or 3D views. For example, coronal plane 160 depicts overview display 120 showing a pelvic area of a patient. The display 120 includes a side-view of a 3D structure 125, which is defined by a plurality of 2D contours that have been defined using the display 105. The display 120 indicates a current contour 130 in bold, a feature which may be used to distinguish the current image plane 135 (which may be indicated via, e.g., a set of arrows at the edges of the display 120) from other image planes. Furthermore, contours may be displayed differently according to their origin, that is, user-generated contours may be displayed differently from interpolated and/or extrapolated contours, as discussed in further detail below. The positions of planes of the plurality of image planes may be indicated by lines 140, located at the edge of display view 120. Embodiments of the present disclosure include various layouts, combining one or more drawing displays with zero or more overview displays.

Typically, if a scanning device is used to generate the image data, the scanning device generates images in slices that are orthogonal to the Z-axis (e.g., the transverse plane 150). However, an image may be generated from the original image data in any orientation, that is, the "planes" of the image need not be orthogonal to the Z-axis, and/or co-planar with the slice data generated by the scanning device. This is because the image dataset may be manipulated ex post facto in order to view image slices at arbitrary plane angles. In other words, the image data can be visualized in 3D and freely rotated, and parallel planes may be defined at an arbitrary angle. Image data, which are sampled in some way (e.g., a voxel grid) having three coordinate axes, may be dynamically re-sampled to form new image slices. These image slices, however, should be parallel to one another, in order to enable calculation of interpolation and/or extrapolation of contours at any time (e.g., during an initial contouring session, and/or at a subsequent session for the same image data). Typically, the distance between image slices is approximately between 1-2.5 mm, although other values for the distance between parallel image slices are consistent with the spirit and scope of the present disclosure. The distance between image slices may be directly tied to the distance between slices generated via imaging device (e.g., based upon imaging system resolution). Or, the distance between image slices may be virtually determined if image planes are defined by image dataset (e.g., not directly from scanning data), in which case a step-size is set for the distance between planes in the virtualized image data.

Manual Contour Generation with Integrated Interpolation

In one aspect, embodiments of the present disclosure provide a contouring tool wherein a user may define a contour on a first image slice, skip several slices, and by defining a second contour (at the remote slice) the contouring tool will respond by performing automated interpolation on planes between the two user-defined contours. A feature of the present disclosure includes automatic interpolation of contours on image planes located between nonadjacent image planes on which a user has manually defined contours, effectively "filling the gaps" while a user is drawing contours. Interpolation distance (e.g., the number of image slices) may be varied according to user selection, e.g., in view of the complexity of the structure to be delineated, which may be determined according to which image slices are selected for manual contour entry. For example, a simple geometry may enable a larger number of slices to be skipped by a user performing the contouring, and therefore a larger number of interpolated slices. Conversely, a more complex geometry may require fewer skipped contours, so that the interpolation does not fail attempting to resolve a too-large change in contour shape over a large distance.

FIGS. 2-5 are illustrations of exemplary contour generation sequences to generate a 3D structure in an image, in accordance with embodiments of the present disclosure. FIG. 2-5 are depicted using a side-view of the respective contouring sequences. While a side-view is not typically the view used for generation of the contour(s), for purposes of clarity the contouring processes integrating interpolation and/or extrapolation are depicted in this manner. In practice the view employed by a user to interact with the contouring tool in order to generate the contour(s) is often a top-down view, e.g., drawing view 105 of FIG. 1.

FIGS. 2-5 each include a vertical dashed line. At the left side of the vertical dividing line of FIGS. 2-5 is the sequence of user inputs for contours (e.g., contour generation or edit), and at the right of the dividing line the corresponding result for each user input. In an embodiment of the present disclosure, the corresponding result shown at the right side occurs after automatic calculation (e.g., by processor 701 of computing system 700 in FIG. 7) following the user input. The automatic calculation may occur immediately following cessation of the user input, e.g., as soon as the user completes generation of a closed contour and ceases to interact with the contour generation tool (a tool such as a drawing pencil, or paintbrush).

Figure 2:
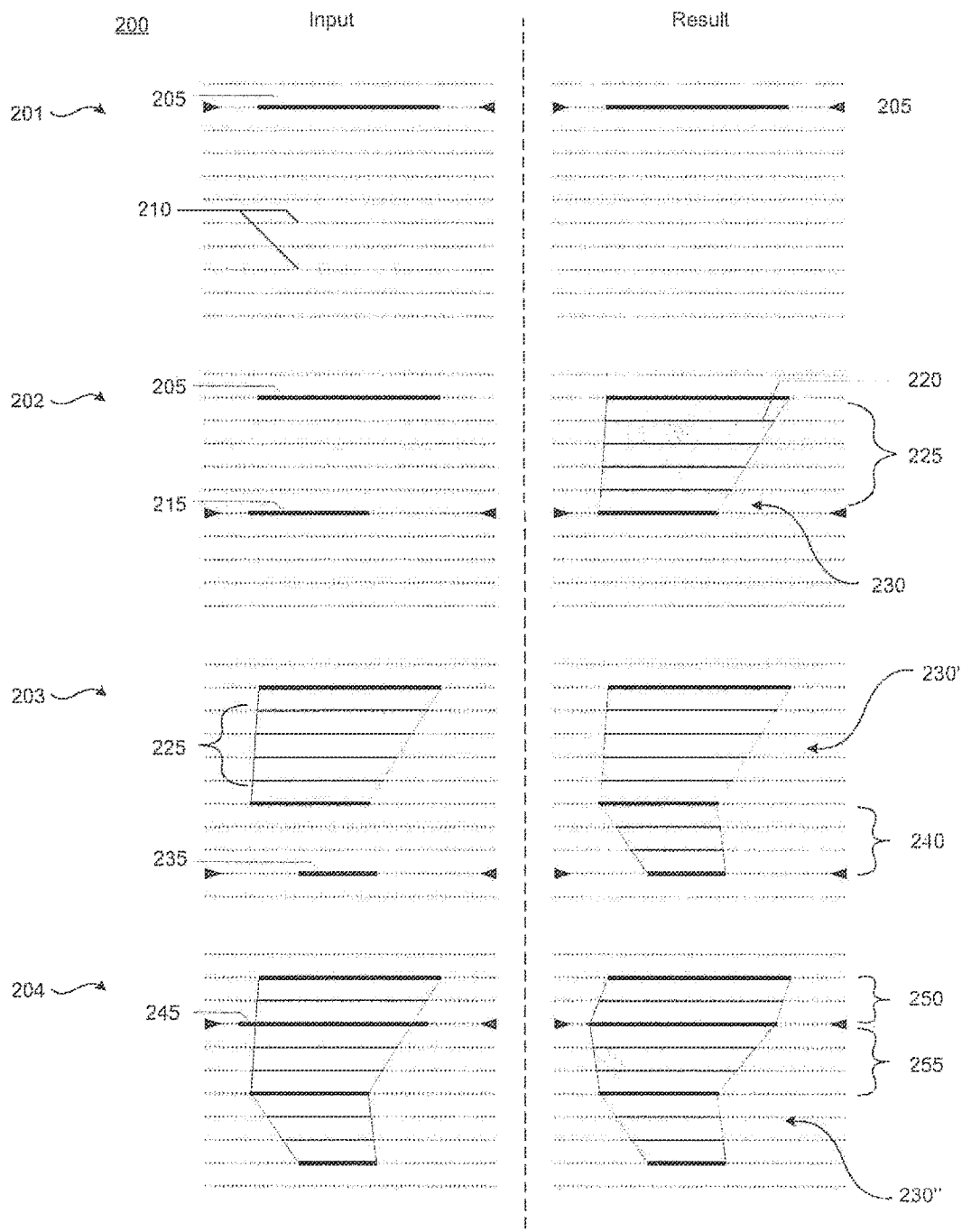
FIG. 2 depicts a side-view of an exemplary contouring sequence, in accordance with embodiments of the present disclosure.

Referring now to FIG. 2, a contouring sequence 200 comprises steps 201-204. At step 201 a user generates, via a manual input, a contour 205 on a single image plane of a plurality of image planes 210, the plurality of image planes corresponding with 2D image slices of an image. The manual input may be made with any suitable 2D drawing tool known to one skilled in the art, e.g., drawing tool 110 of FIG. 1 which may include paintbrushes, polygon or curve tools, deformation tools, or adaptive tools like active contours. The right side of FIG. 2 at step 201 shows no change from the left side, as there is no need for interpolation with only the one contour 205 defined. A minimum number of two (2) user-generated contours must be defined in order for the contouring tool to perform interpolation.

At step 202 the user generates a second contour 215 at a lower image plane (e.g., skipping 4 image planes). Following the user input completing contour 215, shown at the right side of FIG. 2, the system automatically interpolates contours on the image planes in a region 225, the region 225 comprising image planes located between the image plane of contour 205 and the image plane of contour 215. Those planes serve as boundary conditions for the interpolation, but contours on those planes (e.g., 205 and 215) are not modified by the interpolation, in order not to alter the user-made contours. A representative interpolated contour 220 is shown within the interpolation region 225. The two user generated contours 205 and 215, along with the interpolated contours within region 225, form a 3D structure 230 in the image.

At step 203 the user enters a third user-generated contour 235, below the other contours. At the right, the result of the automatic interpolation is additional contour interpolation in a region 240, the region 240 comprising image planes located between the new contour 235 and the nearest user-generated contour, contour 215.

A feature according to embodiments of the present disclosure is targeted interpolation of just a portion of the contours comprising the 3D structure. Embodiments of the present disclosure provide a system and method that remembers and distinguishes contours that are user-defined from those that are interpolated and/or extrapolated. The contouring tool uses this information to determine the region over which interpolation and/or extrapolation will be performed. A user is able to refine the shape of a generated 3D structure by editing any contour in the 3D structure (e.g., either a user-generated contour or an interpolated contour), and the contouring tool will generate (or update) the 3D structure by calculating (or recalculating) interpolated contours only on planes between the edited contour and the nearest user-generated contour(s). Therefore, at step 203 the system automatically interpolates only contours on planes within region 240, generating an updated 3D structure 230'.

At step 204 a user has navigated back through image planes 210, and enters an edit to a formerly interpolated contour, forming a new user-generated contour 245. The user may edit the contour by reshaping the interpolated contour (or contours) of that plane, or by deleting the interpolated contour and entering a new contour. At the right the system automatically recalculates interpolation in order to update the 3D structure, forming updated 3D structure 230". Specifically, interpolation is recalculated only for contours within regions 250 and 255, which comprise those planes between the plane having the user edited contour 245 and the planes having the nearest user-generated contours—in this case, planes having contours 205 and 215. Interpolation is not performed again for region 240, since there have been no changes to the user-generated contours (215 and 235) upon which the interpolated contours of region 240 are based. This feature of the present disclosure minimizes the region(s) that need interpolation following user contour generation and/or editing.

With interactive, integrated interpolation, one can adapt dynamically to the 3D structure generated via contouring. At any time, a user is able to skip however many slices are desired, and following user-generation of contours the user will see the interpolation result visualized shortly thereafter. Again, a user need not adhere to a specific number of image slices to skip. For example, the user in the example of FIG. 2 initially skips 4 image slices between user-generated contours 205 and 215, and then 2 slices between 215 and 235. The contouring tool may interpolate contours just on the image slices between the newly generated contour and the closest one or two slices having user-generated contours. This enables a user to skip over regions of relatively simple geometry, and to define with more user input (e.g., a greater number of user-generated contours) regions with greater complexity. Furthermore, a user is able to refine the shape of the generated 3D structure by selecting and editing any contour within the 3D structure. Additionally, contours may be displayed differently according to their origin, that is, user-generated contours (e.g., contours 205, 215, 235, 245) may be displayed differently from interpolated and/or extrapolated contours (e.g., contour 220, contours in regions 225, 240, 250, 255). For example, user-generated contours may have a different line type, thickness, color, or other feature that clearly distinguishes from interpolated line types. Such information may be shown both in the main drawing display (e.g., display 105 of FIG. 1) and in the overview displays (e.g., display 120 of FIG. 1).

Depending on the desired shape of the 3D segment, the user may draw multiple contours on the same slice plane. In such cases the interpolation may be calculated after each edit of a single contour. As a consequence the algorithm may also create interpolated slices with multiple contours. If the user then modifies a single one of those interpolated contours, all contours on the same slice plane are marked as being edited and included in the boundary conditions of the following interpolation step.

Moreover, there are no constraints on the interpolation and/or extrapolation algorithms used by the contouring tool described by embodiments herein. Algorithms may be purely geometric, such as linear, cubic or spline-based methods, or they can incorporate the underlying pixel data, like level set methods or any other available data such as physical or anatomical models. In an embodiment of the present disclosure, the contouring tool performs calculation of interpolated contours according to several different algorithms in parallel. In these embodiments, the contouring tool may present a preview of the interpolated contours according to each algorithm, and the user is able to select those contours generated by the algorithm giving the best match with the 3D structure being defined. In an embodiment the user is able to select one or more algorithms that will be used to generate the interpolated and/or extrapolated contours.

Figure 3:
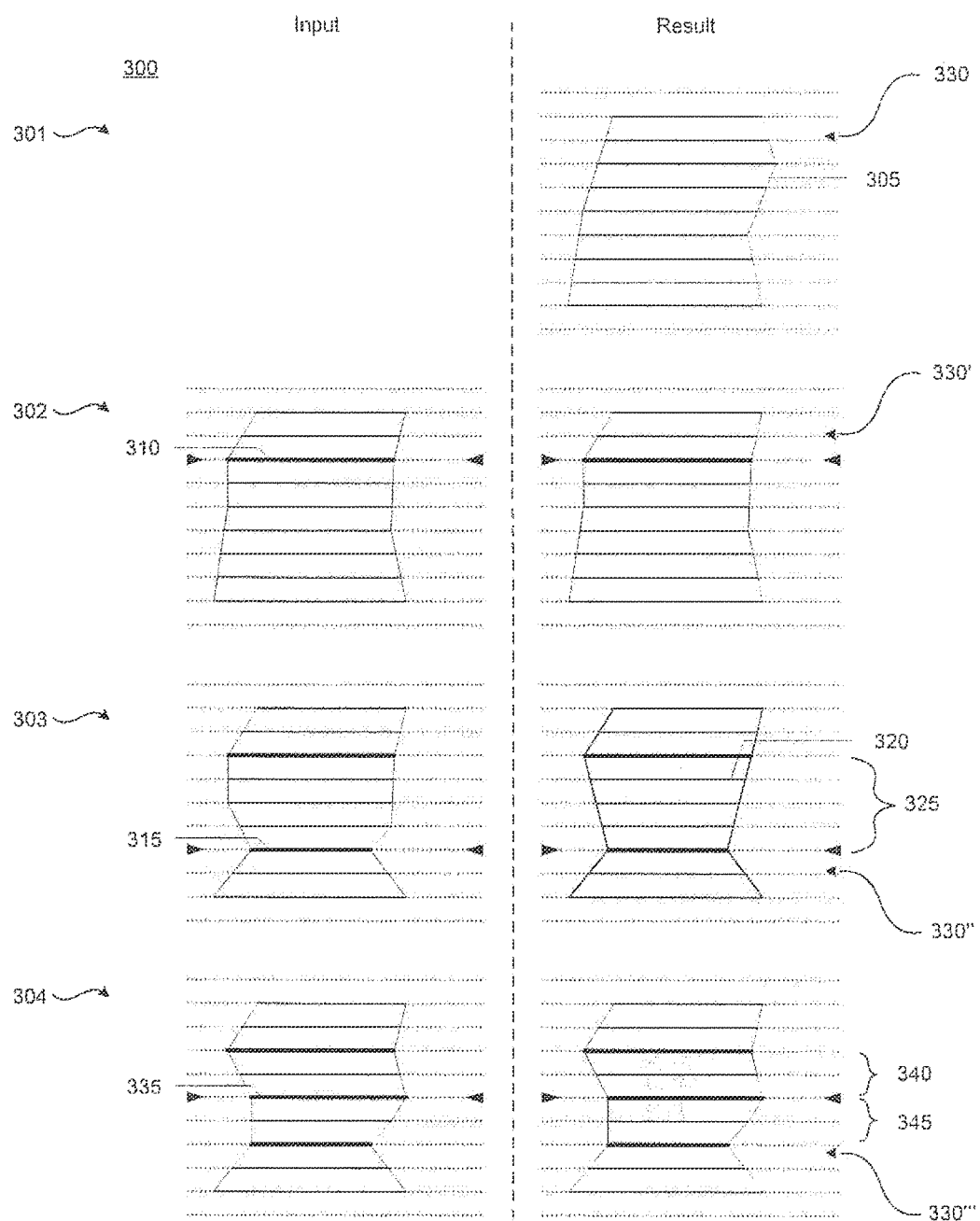
FIG. 3 depicts a side-view of an exemplary contour editing sequence for a 3D structure, in accordance with embodiments of the present disclosure.

Referring now to FIG. 3, a contouring process 300 for editing a 3D structure is depicted, process 300 having steps 301-304. Step 301 does not begin with a user input of a contour, but rather a pre-existing 3D structure 330 is shown, along with a representative contour 305. The 3D structure 330 shown at step 301 may be via, for example, a prior contour/interpolation session, or some other process (such as auto-segmentation, wherein a user is not defining the structure manually). While 3D structure 330 is comprised of multiple image slices, initially 3D structure 330 has no user-defined contours, as there have been no contours defined by a user during the current structure editing session. The structure 330 may have been defined during a prior session (e.g., the contouring/interpolation process 200 in FIG. 2, above). For example, the structure 330 may be from a predefined case of segmentation from a database of the contouring system, or from another database. In an embodiment according to the present disclosure, contours are defined as user-generated only for a given session of a contouring tool. Contours that were user-defined and were the basis for interpolation (or extrapolation, described below) in an earlier session are now displayed and treated identically to the interpolated planes in a later session. In other words, all of the contours of a pre-defined 3D structure may initially be treated identically by the contouring tool at the start of an editing session.

At step 302 the user inputs an edit to a contour 310. The result of the user input is a change in the display of the contour (e.g., it may now be displayed in bold), and the 3D structure 330 has updated that contour and now forms 3D structure 330'. Note that no interpolation has occurred, as there is only one user-defined contour at this point.

At step 303 the user inputs an edit at a lower plane, generating contour 315. This automatically results in a change in the display of the contour 315, as well as the determination of a region 325 over which interpolation is performed. The region 325 includes planes between those planes having contours 310 and 315, and the interpolation results in interpolated contours on the planes of region 325. As shown, a user editing the lower contour (contour 315) leads to interpolation for the region above (region 325), up to the next user-defined contour (contour 310), but not for the region below, because there is no user-defined contour below the currently edited contour (contour 315). Contour 320 is an exemplary interpolated contour within region 325. The user-generated contours 315 and 315, along with the interpolated contours of region 325, form 3D structure 330". In an embodiment of the present disclosure, a region for interpolation (or extrapolation) may be indicated visually to a user, via for example shading of the region or varying line thicknesses in the display area.

At step 304 a user performs an edit of a contour within the interpolated region of step 303. This edit generates contour 335. In response to the user edit, the 3D structure is automatically updated. In particular, regions 340 and 345 are determined to include planes for interpolation, and the interpolation of contours on the planes of regions 340 and 345 generates updated 3D structure 330.'" The regions 340 and 345 are determined because the edited contour 335 has user-defined contours both above (contour 310) and below (contour 315), and therefore interpolation is performed for regions both above (region 340) and below (region 345).

According to an embodiment of the present disclosure, the interpolation of contours 325 can be further refined by an autosegmentation tool in a case where a user skips several planes between manual edits of contours (e.g., contours 310 and 315). The autosegmentation tool is able to insert segmentation data for each of the skipped planes, resulting in contours that are manually defined (via user-edit) at 310 and 315, and contours that are generated via autosegmentation for contours 325. According to an embodiment, the user can subsequently edit one or more of the autosegmented contours 325. A combination of manual edits, interpolation, and autosegmentation is possible, such that contours of the segment may include those that are automatically interpolated, automatically interpolated with subsequent manual edit, autosegmented, and autosegmented with manual edit.

Manual Contour Generation with Integrated Extrapolation

In image segmentation, volumes defined within an image are typically irregular in shape. For such an image, with regard to contouring, copying of an initial contour from one plane onto adjacent planes can be useful. For a 3D segment defined in a plane-by-plane manner, extrapolation can be useful to define a contour, which can either be edited or discarded (but in either case, should speed up user interaction in the contouring procedure). Conventionally, a contouring tool including extrapolation functionality incorporates extrapolation in a piecemeal fashion, that is, each extrapolation process must be incrementally applied after each manual entry of contours. According to an aspect of the present disclosure, extrapolation functionality is integrated with the contour generation tool, and following manual contouring of an initial plane, the next plane accessed is automatically populated by an extrapolated contour. This contour may be initially 'proposed,' allowing the user to accept the proposed contour as-is, or to edit the contour before proceeding to the next plane.

Figure 4:
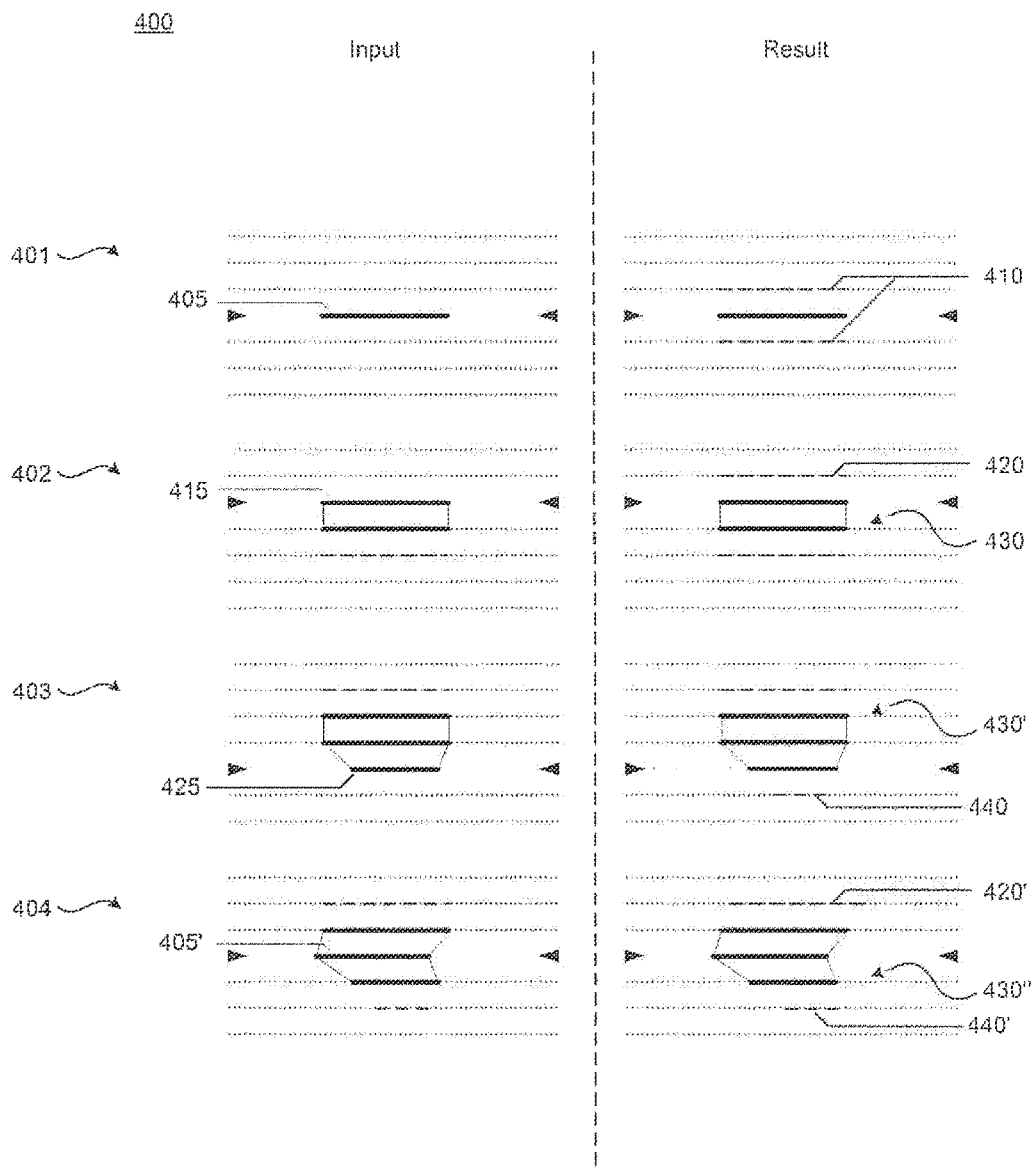
FIG. 4 depicts a side-view of an exemplary contouring sequence, in accordance with embodiments of the present disclosure.

In an embodiment of the present disclosure, extrapolation of contours proceeds in a plane-by-plane fashion. FIG. 4 illustrates a contouring sequence 400 comprising steps 401-404. At step 401 the user defines a first contour 405 on one plane from a plurality of image planes corresponding with 2D image slices of the image. In response to the user input, the system proposes extrapolated contours 410 on the planes above and below the plane of the user-defined contour 405.

At step 402 the user accepts the top proposed contour, generating contour 415. At the right side, the system in response forms a 3D structure 430, comprising the first user generated contour 405 and the accepted extrapolated contour 415. Furthermore, a contour 420 is automatically extrapolated on the plane above that of the newly accepted contour 415.

At step 403 the user accepts the remaining proposed extrapolated contour of the extrapolated contours 410 at step 401. Note that at step 403 the user, in accepting the proposed contour, has made an edit to the contour, generating a contour 425 having a different shape than the contour initially proposed via extrapolation. In response the 3D structure 430 is updated, forming 3D structure 430'. Additionally, a newly proposed contour 440 is automatically extrapolated on the adjacent plane.

Step 404 illustrates a user-edit of an inner contour of the 3D structure. For an extrapolation process, a user edit of an inner contour (e.g., not at the top or bottom of the currently defined structure), may necessitate an update to the proposed extrapolated contours, in order to account for the new shape of the segment. Therefore, embodiments according to the present disclosure provide the capability of updating more extrapolated contours than just those on the immediately neighboring planes of the edited contour. At step 404 a user edit of shifting the center contour to the left generates contour 405'. In response, a change is made to the contours, updating the 3D structure 430' to 3D structure 430", and proposed extrapolated contours 420 and 440 to updated proposed extrapolated contours 420' and 440'.

The shape of the proposed, extrapolated contours shown in FIG. 4 may be based on, for example, linear extrapolation. Alternatively, the extrapolation methods may be pixel-adaptive, methods which are particularly well-suited to shapes visible on the image (e.g., anatomy such as bladder, bone). Defining 3D structures for other kinds of shapes—such as volumes for radiation planning, which are not visible on the image and are therefore not suitable for pixel-adaptive algorithm—may require alternative extrapolation methods. The simplest extrapolation method may be to simply copy the shape of one contour to an adjacent contour on a plane above and/or below.

As discussed above, a feature of contouring tools according to the present disclosure is that extrapolated contours are proposed (e.g., suggested), rather than being, for example, system-defined with a capacity for user edit afterward. This is due to the fact that, when a contour is proposed only, a user must accept it in order to instantiate the contour. The acceptance may be either through applying the proposed contour as-is, or through editing of the proposed contour. When the drawing tool function is ended, any remaining suggested contours may not be applied. In this manner, contouring is completed at the currently-selected plane, rather than at an adjacent plane (which the user may not be viewing, or interested in). As described above, proposed contours may appear as semi-transparent, dashed, or some other displayed line or indicia that is differentiated from the user-defined contours. In an embodiment, once the contouring tool is turned off the proposed contour lines are no longer displayed, as they are a part of the visualization of the contouring tool, not part of the defined 3D segment.

Depending on the desired shape of the 3D segment, the user may draw multiple contours on the same slice plane. In such cases the extrapolation may be calculated after each edit of a single contour. As a consequence the algorithm may also create extrapolated slices with multiple preview contours. In an embodiment, if the user then accepts or modifies a single one of those preview contours, all preview contours on the same slice plane are added to the 3D segment before the extrapolation algorithm is run again.

Manual Contour Generation with Combined Interpolation and Extrapolation

Interpolation and extrapolation functionality need not be implemented as separate features for a contouring tool, according to embodiments of the present disclosure. As an extension of the process 400 described in FIG. 4, the extrapolation of contours is able to be made for more than one boundary slice on each side of a user generated contour. In an embodiment, the extrapolated contours are suggested on all remaining slices of the image, up to the volume boundaries. In such cases the user may accept, for example, any one or more of the extrapolated slices, such that all slices located between the current plane and the existing 3D segment are added to the 3D segment. Furthermore, if a contour is implicitly accepted by the user via editing, any intermediate contours (e.g., between the existing user-generated contour and/or defined 3D segment) may be adapted via interpolation, and then added to the 3D segment.

Figure 5:
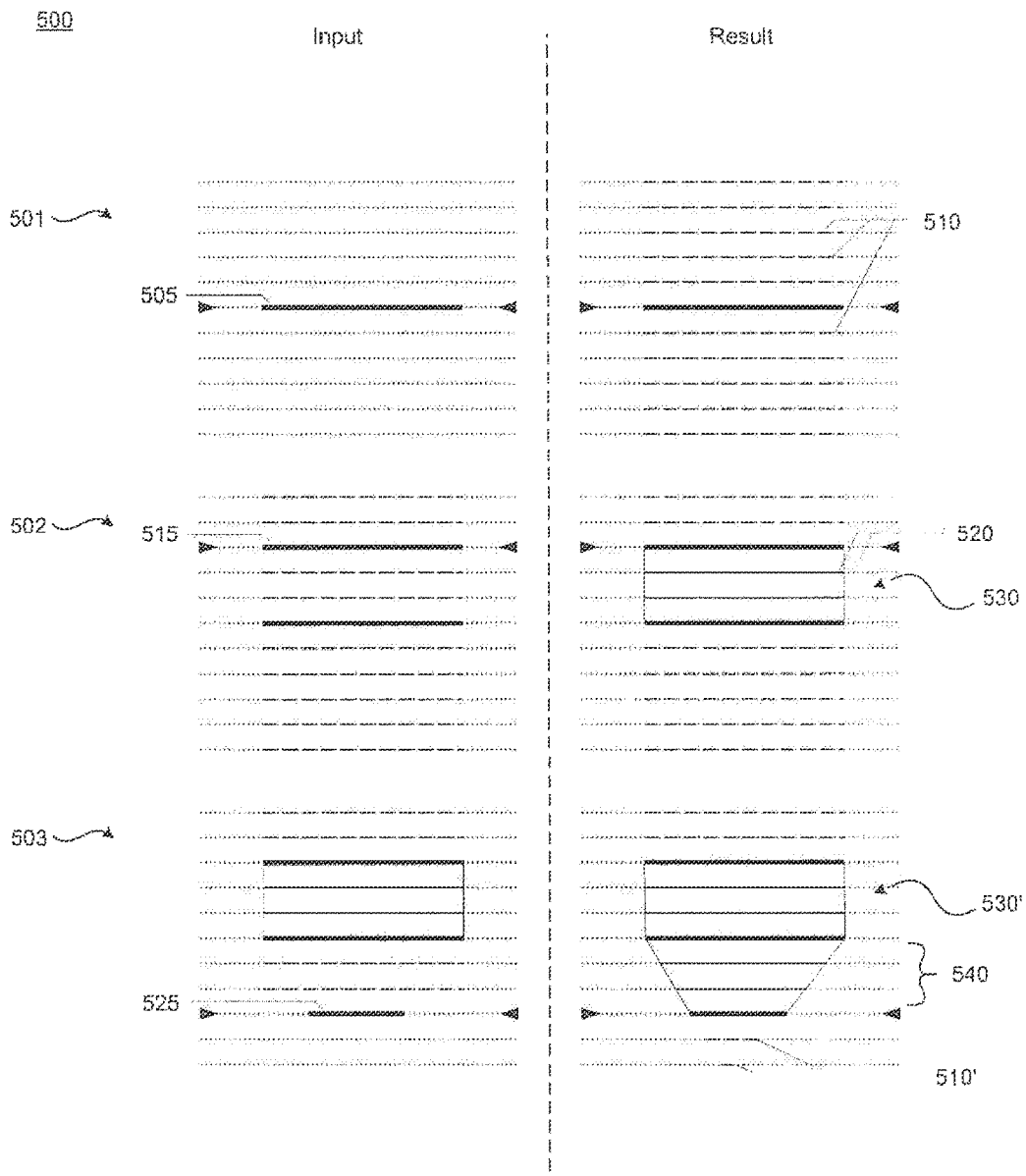
FIG. 5 depicts a side-view of an exemplary contouring sequence, in accordance with embodiments of the present disclosure.

FIG. 5 illustrates a contouring process 500 comprising steps 501-503, in which a combination of automatic interpolation and extrapolation functions are integrated with manual contour entry by a user of the contouring tool. At step 501 a user inputs a first contour 505 on a first image slice. At the right, a plurality of extrapolated contours 510 is generated in response to contour 505. The extrapolated contours are formed on several neighboring image planes both above and below the plane having contour 505, and may include all image planes included in the image volume. According to an embodiment of the present disclosure, a user is able to specify the number of neighboring image planes on which extrapolated contours will be formed.

At step 502 a user accepts, several slices above contour 505, one of the suggested extrapolated contours, forming contour 515. In response, a 3D segment 530 is generated, which includes contours 505 and 515, as well as the (formerly) suggested extrapolated contours 520 on those planes in between the ones of contours 505 and 515.

At step 503 the user accepts, several slices below contour 505, an edited suggested extrapolated contour, forming contour 525. In response, 3D segment 530' is generated. Due to the user edit of the initial suggested extrapolated contour 510, the contours within region 540 are altered; more specifically, an interpolation is performed between the user-generated contours 505 and 525 (which form the boundary conditions of the interpolation). Furthermore, the extrapolation is updated, generating extrapolated contours 510' on the planes below contour 525.

The order of operation for interpolation and extrapolation functions with the contouring tool may be varied. In one case, first interpolation is performed, and then extrapolation accounts for the current set of user-defined contours. In another case, extrapolation is performed first, and then interpolation is performed based on user-defined contours.

Figure 6:
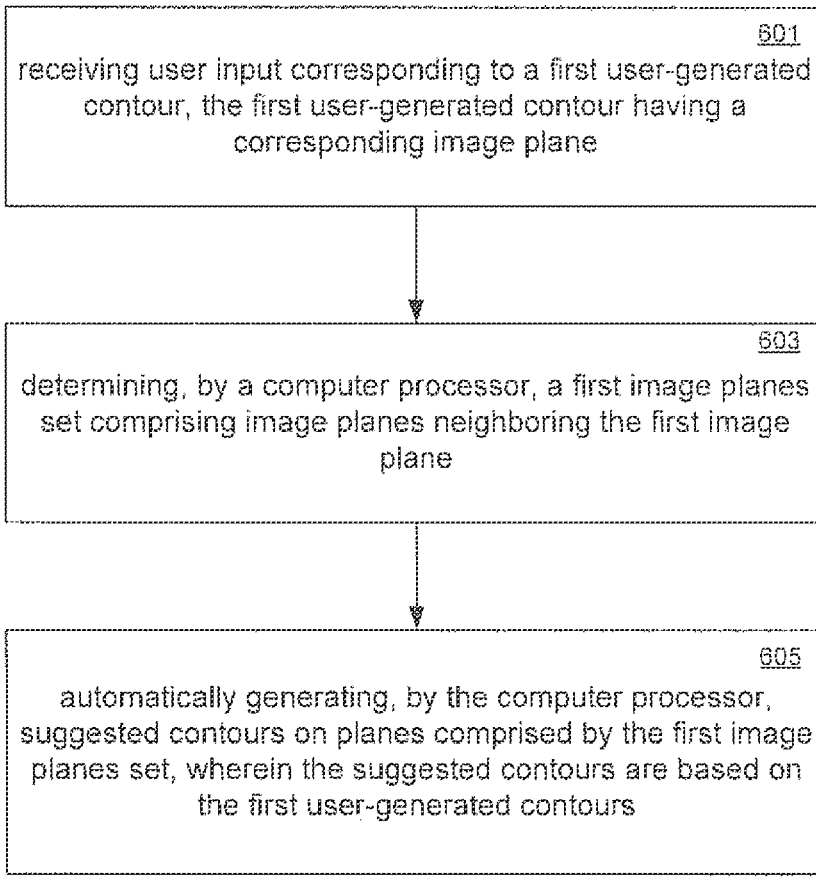
FIG. 6 depicts steps of an exemplary contour generation process, in accordance with embodiments of the present disclosure.

FIG. 6 depicts a flowchart 600 of a method of generating a contour for an image having a plurality of image slices (e.g., 2D image planes defining a 3D image volume), in accordance with embodiments of the present invention. Contouring may be performed for an image in order to define a 3D structure of interest within the image.

The steps 601-605 describe exemplary steps comprising the process depicted in flowchart 600 in accordance with the various embodiments herein described. In one embodiment, the flowchart 600 is implemented as computer-executable instructions stored in a computer-readable medium and performed by a computing device (e.g., such as computing device 700 of FIG. 7) executing a process for contouring an image to define image structures of interest, for example, for a 3D segment in a medical image.

At step 601 user input is received, corresponding to a first contour generated by the user. The first contour is defined on a first plane (e.g., image slice) of the image. The user input may be received through a graphical user interface of the software application (e.g., drawing workspace 100 of FIG. 1). In an embodiment the user input corresponds with one closed contour on the image slice. In an embodiment the user input corresponds to multiple closed contours, all located on the same image slice.

At step 603 a determination is made of which image planes of the image are located neighboring the plane having the first contour. These planes form a first image planes set. In one embodiment the image planes included in the first image planes set are the immediately adjacent planes to the plane having the first contour (e.g., one plane above, and one plane below the plane having the first contour). In an embodiment, a plurality of neighboring planes is included in the first image planes set (e.g., several planes above, several planes below the plane having the first contour). In an embodiment, all planes in the image volume are included in the first image planes set.

At step 605 the computing system automatically generates one or more contours for planes included in the first image planes set. In an embodiment, the automatically generated one or more contours are immediately added to the first user-generated contour, generating or extending a 3D structure in the image volume. In an embodiment, the one or more contours are proposed (e.g., displayed as suggestions), and require further user input (e.g., accepting as-is, or via editing) prior to inclusion in the 3D structure that is being defined by the user during the contouring session. The one or more contours may be generated using interpolation, extrapolation, or a combination of both interpolation and extrapolation. The shape of the contours and their location within respective planes are based on the shape and location of the first user-generated contour.

According to an embodiment of the present disclosure, interpolation of contours may be combined and/or cross-referenced (e.g., based on comparison of two or more image segments). For example, a first image planes set can be based on x-y plane slices along a z-axis of a 3D volumetric image. A first segmentation data is generated by a process as described herein (e.g., manual entry of user-generated contours, interpolation and/or extrapolation of contours at neighboring planes). A second image planes set is then generated based on plane slices at a different orientation in the image volume—for example, x-z plane slices along the y axis of the 3D volumetric image. A second segmentation data is likewise generated by a process as described herein (e.g., manual entry of user-generated contours, interpolation and/or extrapolation of contours at neighboring planes). Thereafter, the processor is able to access the first segmentation data and reference the contour from the second segmentation data in order to modify the first segment—for example, to make corrections to the segment. Alternatively, segmentation may be performed on the first image planes set and on the second image planes set, independently, and subsequent interpolation and/or extrapolation is able to be applied via cross-referencing both image planes sets. While the two image planes sets thus described are perpendicular, this is not a requirement of the present embodiment.

Exemplary Computing Device

Figure 7:
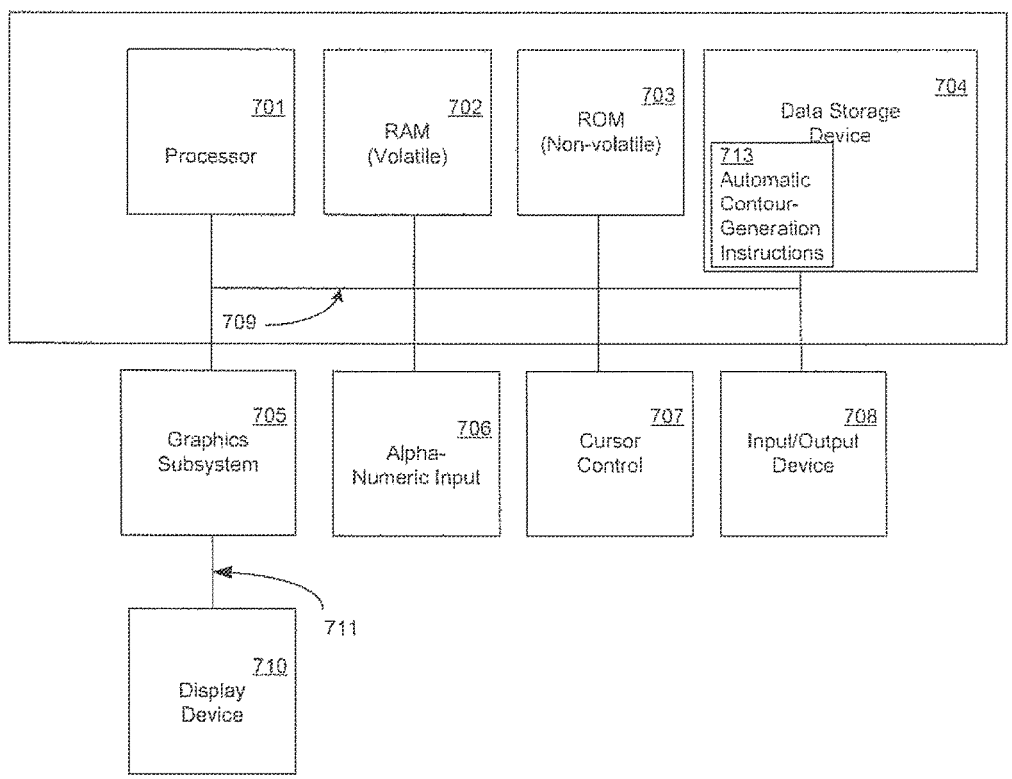
FIG. 7 depicts an exemplary computing environment, in accordance with embodiments of the present disclosure.

As presented in FIG. 7, an exemplary system upon which embodiments of the present invention may be implemented includes a general purpose computing system environment, such as computing system 700. In its most basic configuration, computing system 700 typically includes at least one processing unit 701 and memory, and an address/data bus 709 (or other interface) for communicating information. Depending on the exact configuration and type of computing system environment, memory may be volatile (such as RAM 702), non-volatile (such as ROM 703, flash memory, etc.) or some combination of the two. In some embodiments the memory is substantially radiation-hardened, using substrates and/or logical methods known to those skilled in the art.

Computer system 700 may also comprise an optional graphics subsystem 705 for presenting information to the computer user, e.g., by displaying information on an attached display device 710, connected by a video cable 711. According to embodiments of the present disclosure, the graphics subsystem 705 may be coupled directly to the display device 710 through the video cable 711. A graphical user interface of an image viewing software application executing in the computer system 700 may be generated in the graphics subsystem 705, for example, and displayed to the user in the display device 710. For example, the graphics subsystem 705 may present a graphical user interface (GUI) including a contouring tool according to embodiments of the present disclosure, such as GUI 100 of FIG. 1. In alternate embodiments, display device 710 may be integrated into the computing system (e.g., a laptop or netbook display panel) and will not require a video cable 711.

Additionally, computing system 700 may also have additional features/functionality. For example, computing system 700 may also include additional storage (removable and/or non-removable) including, but not limited to, magnetic or optical disks or tape. Such additional storage is illustrated in FIG. 7 by data storage device 704. Computer storage media includes volatile and nonvolatile, removable and non-removable media implemented in any method or technology for storage of information such as computer readable instructions, data structures, program modules or other data. RAM 702, ROM 703, and data storage device 704 are all examples of computer storage media.

In an embodiment, computer system 700 comprises instructions for performing processes according to aspects of the present disclosure, where the instructions may be stored on RAM 702, ROM 703, and/or data storage 704. For example, the computer system 700 may comprise automatic contour generation instructions 713, where automatic contour generation instructions 713 contain instructions causing computer system 700 to perform a process of generating one or more contours automatically from user-generated contour(s), according to embodiments of the present disclosure (e.g., processes 200, 300, 400, 500, 600).

Computer system 700 also comprises an optional alphanumeric input device 706, an optional cursor control or directing device 707, and one or more signal communication interfaces (input/output devices, e.g., a network interface card) 708. Optional alphanumeric input device 706 can communicate information and command selections to central processor 701. Optional cursor control or directing device 707 is coupled to bus 709 for communicating user input information and command selections to central processor 701. Signal communication interface (input/output device) 708, also coupled to bus 709, can be a serial port. Communication interface 709 may also include wireless communication mechanisms. Using communication interface 709, computer system 700 can be communicatively coupled to other computer systems over a communication network such as the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. The subject matter is not limited to medical imaging, but may be applied in any drawing environment where 3D shapes are constructed by 2D drawing, such as 3D model construction, computer aided design, and relief generation in geographic systems. The specific features and acts described above are disclosed as example forms of implementing the claims.

What is claimed is:

1. A computer-implemented method of automatically generating a contour based on user-generated contours for defining a 3D structure in an image, the method comprising:
    receiving user input corresponding to a first user-generated contour and a second user-generated contour having a first image plane and a second image plane, respectively, wherein the first and second image planes are nonadjacent having at least one image plane disposed between the first and second image planes;
    determining, by a computer processor, a first image planes set comprising image planes disposed between the first and second image planes;
    automatically generating, by the computer processor, first interpolated contours on planes comprised by the first image planes set, the first interpolated contours being based on the first and second user-generated contours;
    automatically generating and displaying, by the computer processor, an extrapolated contour on a third image plane that is separated from the first and second image planes and the first image planes set therebetween by a second image planes set comprising at least one image plane, wherein the extrapolated contour is based on a user-specified number of image planes that neighbor the third image plane; and
    automatically generating, by the computer processor, second interpolated contours on planes comprised by the second image planes set, the second interpolated contours being based on the extrapolated contour.

2. The method according to claim 1, further comprising:
    receiving user input corresponding to a selection of an interpolated contour;

receiving user input corresponding to a user modification of the interpolated contour; and automatically updating, by the computer processor, interpolated contours in the first image planes set disposed between the user-modified interpolated contour and the first user-generated contour and between the user-modified interpolated contour and the second user-generated contour, wherein the updating is based on the user-modified interpolated contour and the first and second user-generated contours.

3. The method according to claim 2, wherein the user modification comprises deletion of the interpolated contour and generation of a new contour.

4. The method according to claim 1, wherein the first and second user-generated contours are displayed with a different visual appearance than the first interpolated contours.

5. The method according to claim 1, wherein a selection of different versions of the first and second interpolated contours is provided, wherein the different versions are based on different interpolation algorithms.

6. The method according to claim 1, wherein the image planes comprised by the first image planes set are displayed with a different visual appearance than other displayed image planes.

7. The method according to claim 1, further comprising:
receiving user input corresponding to a third user-generated contour, the third user-generated contour having a corresponding image plane, wherein the third image plane is nonadjacent to at least one of the first and second image planes;

determining, by the computer processor, a third image planes set comprising image planes disposed between the third image plane and the at least one nonadjacent first and second image planes; and automatically generating, by the computer processor, third interpolated contours on planes comprised by the third image planes set, wherein the third interpolated contours are based on the first, second, and third contours.

8. The method of claim 1, wherein the first image plane is parallel with the second image plane.

9. The method of claim 1, further comprising determining distances between the image planes disposed between the first and second image planes, wherein an interpolation distance corresponding to an extent to which the user-generated contours are interpolated through the planes comprised by the first image planes set is based on a complexity of a geometry of the user-generated contours and the distances between the image planes in the first image planes set and the first and second image planes.

10. The method of claim 9, wherein the distance is approximately between 1 mm and 2.5 mm.

11. The method of claim 9, wherein the determining distances between the image planes disposed between the first and second image planes comprises using a step-size as a distance between image planes for virtualized image data.

12. A computer-implemented method of automatically generating a contour based on a user-generated contour for defining a 3D structure in an image, the method comprising:
receiving user input corresponding to a first user-generated contour, the first user-generated contour having a corresponding first image plane;

determining, by a computer processor, a first image planes set comprising image planes comprising a second image plane and a third image plane separated by the first image plane;

automatically generating and displaying, by the computer processor, extrapolated contours on the first image planes set, the extrapolated contours being based on the first user-generated contour, wherein the extrapolated contours are based on a user-specified number of image planes that neighbor the first image plane; and automatically generating, by the computer processor and based on the extrapolated contours, interpolated contours on image planes between the first and third image planes and interpolated contours on image planes between the second and third image planes.

13. The method according to claim 12, further comprising:
receiving user input corresponding to a selection of a contour;

receiving user input corresponding to a user modification of the selected contour; and automatically updating, by the computer processor, the extrapolated contours, wherein the updating is based on the user modification of the selected contour, and the user-generated contours;

wherein the selected contour is one of a user-generated contour and an accepted contour.

14. The method according to claim 12, wherein the number of image planes in the first planes set is variable.

15. The method according to claim 12, wherein the first user-generated contour is displayed with a different visual appearance than the extrapolated contours.

16. The method of claim 12, wherein the image planes of the first image planes set comprise parallel planes.

17. An apparatus for automatically generating a contour based on a user-modified contour in an image, the apparatus comprising:
a memory configured to store a plurality of contours disposed on a plurality of structures in a plurality of parallel planes; and a processor coupled to the memory and configured to automatically update contours of a structure comprising the plurality of contours, responsive to user input indicating modification of at least two contours of the plurality of contours, the at least two contours being disposed on at least two nonadjacent and parallel planes of the plurality of parallel planes;

wherein the processor is further configured to determine a first set of planes from the plurality of parallel planes disposed between the at least two parallel planes and to interpolate first contours on planes comprised by the first set of planes, the first contours being interpolated based on the at least two modified contours;

the processor further configured to determine an extrapolated contour on a third plane that is separated from the at least two planes and the first set of planes by a second set of planes, wherein the extrapolated contour is based on a user-specified number of image planes that neighbor the third plane; and the processor further configured to automatically generate second interpolated contours on planes comprised by the second set of planes, the second interpolated contours being based on the extrapolated contour.

18. The apparatus of claim 17, wherein a selection of different interpolation algorithms is provided.

19. The apparatus of claim 17, wherein the processor is further configured, responsive to user input, to extrapolate one or more contours on one or more structure planes adjacent to a boundary structure plane having a contour.

* * * * *